United States Patent [19]

Schaefer et al.

[11] 4,327,139

[45] Apr. 27, 1982

[54] RIGID MAGNETIC RECORDING DISK HAVING PERFLUOROPOLYETHER LUBRICANT

[75] Inventors: Dieter Schaefer, Lindenberg; Herbert Motz, Willstaett; Dieter Mayer, Ludwigshafen; Paul Deigner, Willstaett; Joachim Hack, Ludwigshafen; Roland Falk, Achern, all of Fed. Rep. of Germany

[73] Assignee: BASF Aktiengesellschaft, Fed. Rep. of Germany

[21] Appl. No.: 66,556

[22] Filed: Aug. 15, 1979

[30] Foreign Application Priority Data

Sep. 11, 1978 [DE] Fed. Rep. of Germany ....... 2839378

[51] Int. Cl.$^3$ .......................... G11B 5/82; B32B 7/02; B32B 27/00
[52] U.S. Cl. ........................................ 428/65; 428/64; 428/216; 428/341; 428/422; 428/695; 428/900
[58] Field of Search ................................ 360/131–136; 427/131; 428/421, 469, 900, 340, 422, 695; 358/128.5

[56] References Cited

U.S. PATENT DOCUMENTS

| | | | |
|---|---|---|---|
| 3,778,308 | 12/1973 | Roller et al. ......................... | 428/421 |
| 3,919,719 | 11/1975 | Wright et al. ................... | 428/900 X |
| 4,154,895 | 5/1979 | Ogawa et al. .................... | 360/135 X |
| 4,172,171 | 10/1979 | Suzuki et al. .................... | 360/135 X |
| 4,172,176 | 10/1979 | Tanaka et al. ................... | 360/135 X |
| 4,188,434 | 2/1980 | Loran ............................... | 360/134 X |
| 4,268,556 | 5/1981 | Pedrotty ...................... | 358/128.5 X |

FOREIGN PATENT DOCUMENTS 2633736 2/1977 Fed. Rep. of Germany .
1522748 8/1978 United Kingdom .

*Primary Examiner*—Aristotelis M. Psitos
*Attorney, Agent, or Firm*—Keil & Witherspoon

[57] ABSTRACT

A magnetic recording medium comprising a non-magnetic base and a magnetizable layer which is applied to at least one side thereof and comprises magnetic particles finely dispersed in a polymeric binder and additives, the surface of the magnetizable layer being provided with a coating of a perfluoropolyether oil mixture as a lubricant.

2 Claims, No Drawings

RIGID MAGNETIC RECORDING DISK HAVING PERFLUOROPOLYETHER LUBRICANT

The present invention relates to a magnetic recording medium comprising a non-magnetic base and a firmly adhering magnetic layer applied thereto, the surface of the magnetic layer carrying a thin coating of a perfluoropolyether oil as a lubricant.

Magnetic recording media, eg. magnetic tapes for computer, video and audio applications, and magnetic disks, which are extensively used in data processing, are subjected to substantial wear, through contact with parts of the apparatus, in sustained operation. For example, magnetic disks are run at speeds of up to 3,600 rpm in modern data processing equipment. The magnetic heads, due to their aerodynamic shape, fly at a short distance above the disk surface on cushion of air produced by rotation of the disk. The distance between the surface of the disk and the magnetic head may be as little as 0.5 μm. At such a small distance, microscopic extraneous particles, such as dust, or the slightest unevenness in the layer, may be sufficient to interfere with the flight of the magnetic head to such an extent that contact between the head and the disk occurs. This may result in loss of data or damage to the magnetic disk. The deposits of coating material on the head and on the surface of the disk can easily lead to head crashes because they interfere with the flight of the head, and such crashes can result in the destruction of the magnetic head and render the disk pack unusable. Hence, the data-bearing layer of magnetic disks, which in general has a thickness of from 1.0 to 2.0 μm because of the high resolution required, also has to meet high standards as regards mechanical resistance.

In the case of flexible magnetic disks, which are also employed in peripheral data processing, in the main as small stores in data recording equipment, the magnetic head is pressed against the rotating disk, and consequently the wear resistance of the magnetic layer must be particularly high.

The reliability of audio tapes, such as tapes for amateur use and cassette tapes, depends greatly on the abrasion resistance of the magnetic layer even under extremely adverse climatic conditions, such as high temperature and high atmospheric humidity, and under adverse apparatus conditions, eg. as found with apparatus where the parts which come into contact with the tape are badly worn and can therefore have a very abrasive action on the tape surface. Tapes with inadequate abrasion resistance, operated under adverse conditions, necessitate constant cleaning of the soiled parts of the apparatus.

The addition of lubricants such as fatty acids, fatty acid esters and fatty acid amides, natural and synthetic hydrocarbons, silicone oils and slid lubricants, such as graphite or molybdenum disulfide, as a rule does not result in the desired improvement of the wear characteristics. It has also been proposed to add minute hard abrasive particles, consisting of corundum, carborundum, quartz powder and the like, to the magnetic layer of magnetic disks, in order to improve the wear resistance. A disadvantage of such additives is that the magnetic head, should it contact the magnetic layer, for its part suffers severe wear. Furthermore, such additives do not reliably protect the surface of the magnetic layer.

The surface treatment of the magnetic medium with perfluoroethyl polyethers and perfluoroisopropyl Polyethers, disclosed in U.S. Pat. No. 3,778,308, represents a substantial improvement over the above type of lubrication, though even this process does not satisfy all requirements. The long-term behavior of these lubricants is not satisfactory, and the lubricating effect diminishes on sustained use, presumably due to some volatility of the compound or due to diffusion into the magnetic layer. To achieve an adequate lubricating action, relatively large amounts of this lubricant must be applied to the surface, and this can lead to drop-outs due to the formation of minute beads of lubricant.

It is an object of the present invention to provide a magnetic recording medium which comprises a lubricating coating on the magnetizable layer, which lubricating coating, even when applied in minute amounts, permanently reduces mechanical wear of the magnetic layer.

We have found that this object is achieved and that a magnetic recording medium which comprises a non-magnetic base and a magnetizable layer applied to at least one side thereof and containing magnetic particles finely dispersed in a polymeric binder and additives, and which possesses a lubricating coating on the surface of the magnetic layer, has the required properties if the lubricating coating consists of a layer, of from 1 to 300 mg/m², of one or more perfluoropolyether oil mixtures selected from the group consisting of (a) a perfluoropolyether oil mixture of the general formula

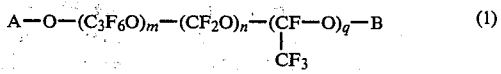

$$A-O-(C_3F_6O)_m-(CF_2O)_n-(CF-O)_q-B \qquad (1)$$
$$\phantom{A-O-(C_3F_6O)_m-(CF_2O)_n-(}|$$
$$\phantom{A-O-(C_3F_6O)_m-(CF_2O)_n-(}CF_3$$

where m is an integer from 15 to 100, n is an integer from 1 to 80, q is an integer from 1 to 9, the sum (m+n+q) is an integer from 17 to 100, the ratio of n to m+q is from 0.06 to

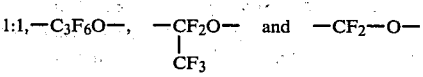

1:1, —C₃F₆O—, —CF₂O— and —CF₂—O—
                                    |
                                    CF₃ are oxyperfluoroalkylene units distributed at random along the chain, and A and B are identical or different groups selected from amongst —CF₃, —C₂F₅ and —C₃F₇, and (b) a perfluoropolyether oil mixture of the general formula

ti A—O—(C₂F₄O)ₚ—(CF₂O)ᵣ—B    (2)

where p is an integer from 30 to 300, r is an integer from 5 to 300, the sum (p+r) is an integer from 35 to 600, the ratio of r to p is from 0.15 to 1.5:1, —C₂F₄O— and —CF₂O— are oxyperfluoroalkylene units distributed at random along the chain, and A and B are —CF₃ or —C₂F₅.

In the perfluoropolyether oil mixtures of the formula (1) which are used preferentially, m is an integer from 15 to 70, especially from 30 to 60, n is an integer from 5 to 40, especially from 10 to 30, q is an integer from 3 to 9, the sum (m+n+q) is an integer from 23 to 119, the ratio of n to m+q is from 0.28 to 0.50:1, —C₃F₆O—, —CF₂O— and

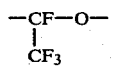

are oxyperfluoroalkylene units distributed at random along the chain and A and B are identical or different groups selected from amongst —CF$_3$, —C$_2$F$_5$ and —C$_3$F$_7$, whilst in the preferentially used perfluoropolyether oil mixtures of the formula (2), p is an integer from 35 to 250, r is an integer from 6 to 250, the sum (p+r) is an integer from 41 to 500, the ratio of r to p is from 0.15 to 1.5:1, —C$_2$F$_4$O— and —CF$_2$O— are oxyperfluoroalkylene units distributed at random along the chain, and A and B are —CF$_3$ or —C$_2$F$_5$.

These compounds which improve the wear resistance of recording media to a surprising degree are disclosed in German Laid-Open Application DOS No. 2,633,736, as is their preparation. They are currently used as motor fluids, sealants and lubricants for vacuum diffusion pumps in the fields of vacuum technology and low temperature technology, at extremely low temperatures and at residual pressures of less than 10$^{-7}$ mm Hg.

Improved wear resistance is not restricted to a particular type of medium. Thus, the object of the invention is found to be achieved both with flexible recording media such as magnetic tapes and data recording disks of the diskette type, and with rigid magnetic disks. In the case of flexible recording media, it has proved advantageous to use the lubricant in an amount of from 30 to 300, preferably from 100 to 200, mg/m$^2$ of surface area, whilst in the case of the rigid magnetic disks amounts of as little as from 1 to 20, preferably from 2 to 15, mg/m$^2$ of surface area suffice. The perfluoropolyether oil mixtures are applied by dipping, spraying or application with a pad or brush. Preferably, a solution in trifluorotrichloroethane is used to apply these compounds to the magnetic layer.

The magnetic recording media according to the invention are distinguished by a conspicuous decrease in the mechanical wear of the magnetic layer. In all the conventional tests for assessing the life of magnetic recording media, surprisingly advantageous results are obtained, and this favorable behavior is maintained for long periods of time. Compared to the closest prior art coatings of perfluoroalkyl polyethers, those according to the invention, although applied in smaller amounts, give better results.

The Examples which follow illustrate the invention.

EXAMPLE 1

A flexible data recording disk carrying a prior art magnetic layer was subjected to a drop-out test. Thereafter, the disk was provided with a coating, in an amount of 140 mg/m$^2$, by dipping into a 1.5% strength solution of a compound of the formula

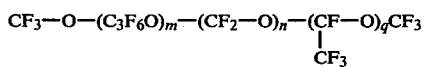

m: 30
n: 10
q: 5 having a molecular weight of 8,000, in trifluorotrichloroethane, and then removing the excess solution by spinning. Following this after-treatment, the drop-out test was repeated, and a wear test was carried out, both on a commercial drive unit. In the drop-out test, the change in drop-outs before and after the application of the lubricating coating was assessed, whilst in the wear test the number of revolutions of the disk in contact with the magnetic head before occurrence of errors due to wear was assessed. In this test, the magnetic head was left in the same position on one of the outer tracks.

The wear test was repeated on diskettes from the same batch which had been stored for 60 days at 55° C. in order to anticipate any aging effect.

Table 1 shows the results of the tests.

EXAMPLE 2

The procedure described in Example 1 was followed, except that a compound of the formula

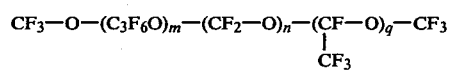

m: 60
n: 30
q: 8 having a molecular weight of 15,500 was used in the lubricating coating. The amount applied was 160 mg/m$^2$ of surface area. The test results are shown in Table 1.

EXAMPLE 3

The procedure described in Example 1 was followed, except that a compound of the formula

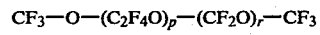

p: 80
r: 70 having a molecular weight of 1,500 was used in the lubricating coating. The amount applied was 140 mg/m$^2$ of surface area. The test results are shown in Table 1.

EXAMPLE 4

The procedure described in Example 1 was followed, except that a compound of the formula

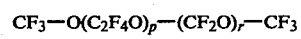

p: 150
r: 80 having a molecular weight of 23,000 was used in the lubricating coating. The amount applied was 160 mg/m$^2$ of surface area. The test results are shown in Table 1.

COMPARATIVE EXPERIMENT A

A flexible magnetic disk from the same production batch as in Examples 1–4 was subjected, without after-treatment, to the same tests as in Example 1. The test results are shown in Table 1.

COMPARATIVE EXPERIMENT B

The procedure followed was as described in Example 1, but instead of the perfluoropolyether oil mixture a perfluoroisopropylpolyether having a molecular weight of about 2,100 was used for the after-treatment. The amount applied was 140 mg/m$^2$. The test was carried out as described in Example 1 and the results are shown in Table 1.

COMPARATIVE EXPERIMENT C

The procedure followed was as described in Comparative Experiment B, but the amount applied was 210 mg/m$^2$. The test was carried out as described in Example 1 and the results are shown in Table 1.

TABLE 1

| Experiment | Number of drop-outs before application of lubricating coating | Number of drop-outs after application of lubricating coating | Number of revolutions before occurrence of errors before aging | Number of revolutions before occurrence of errors after aging |
|---|---|---|---|---|
| Example 1 | 2 | 2 | $>10 \times 10^6$ | $>10 \times 10^6$ |
| Example 2 | 0 | 0 | $7.5 \times 10^6$ | $7 \times 10^6$ |
| Example 3 | 0 | 0 | $>10 \times 10^6$ | $9.4 \times 10^6$ |
| Example 4 | 1 | 2 | $6.3 \times 10^6$ | $7.0 \times 10^6$ |
| Comparative Experiment A | 0 | 0 | $0.2 \times 10^6$ | $0.4 \times 10^6$ |
| Comparative Experiment B | 0 | 2 | $2.9 \times 10^6$ | $2.2 \times 10^6$ |
| Comparative Experiment C | 0 | 16 | $9.8 \times 10^6$ | $7.8 \times 10^6$ |

EXAMPLE 5

A perfluoropolyether oil as described in Example 1 was applied, in an amount of 5 mg/m$^2$ of surface area of the magnetic layer, to a 14 inch magnetic memory disk having a prior art magnetic layer 1.7 μm thick at the outer edge. The oil was applied by means of a cloth impregnated with an 0.02% strength solution of the compound in trichlorotrifluoroethane.

To test the wear resistance, the magnetic disk was subjected to the ceramic pin test. In this test, a ceramic pin having a round tip is pressed against the rotating magnetic disk. A very severe mechanical stress is thereby applied to the magnetic layer on this track. The time required to damage the magnetic layer is recorded as the wear resistance time. The longer the period between application of the ceramic pin and destruction of the layer, the greater is the wear resistance. Incipient destruction of the layer is detectable by means of an amplifier connected to the pin, as a significant change in the oscillation of the ceramic pin.

In this test, the pin bore against the disk surface with a pressure of 80 pond, the speed of the rotating disk was 100 rpm and the radius of the round tip of the pin was 5 μm.

The wear test is repeated on disks which have been aged by storage at 60° C. for 60 days after applying the lubricating coating.

A further test by means of which not only the surface quality of magnetic disks but especially head wear can be measured is the ferrite pin test. In this case, the pin is made of the same material as the magnetic head. Before use, the ferrite pin is so ground that a round tip having a radius of 5 μm is obtained; at the start of the test the ferrite pin thus makes point contact with the disk surface. The pin bears against the disk surface with a pressure of 60 pond which is exerted by a spring. In the test, the disk is rotated at 100 rpm and the ferrite pin is moved radially to and fro across the disk over a distance of 30 mm 60 times per minute. After 8,000 revolutions of the disk, the maximum diameter of the abraded area of the pin is measured.

This test was repeated on a magnetic disk which after application of the perfluoropolyether oil mixture had been aged for 60 days at 60° C.

The test results are shown in Tables 2 and 3.

EXAMPLE 6

The procedure described in Example 5 is followed, except that the perfluoropolyether oil from Example 3 is used. The amount applied is 2.5 mg/m$^2$ of surface area of the magnetic layer. The results are shown in Tables 2 and 3.

COMPARATIVE EXPERIMENT D

A magnetic disk is subjected, without after-treatment, to the same test as that described in Example 5. The results are shown in Tables 2 and 3.

COMPARATIVE EXPERIMENT E

The procedure described in Example 5 is followed, but a perfluoroisopropyl-polyether having a molecular weight of 2,100 is used. The amount applied is 6 mg/m$^2$ of surface area of the magnetic layer. The test results are shown in Tables 2 and 3.

TABLE 2

Wear resistance of the magnetic layer

| Experiment | Wear resistance time [seconds] Before aging | Wear resistance time [seconds] After aging |
|---|---|---|
| Example 5 | $6.5 \times 10^4$ | $5.0 \times 10^4$ |
| Example 6 | $3.8 \times 10^4$ | $4.1 \times 10^4$ |
| Comparative Experiment D | 130 | 130 |
| Comparative Experiment E | $4.5 \times 10^3$ | $8.3 \times 10^2$ |

TABLE 3

Magnetic head wear

| Experiment | Diameter of the abraded area of the pin [μm] Before aging | Diameter of the abraded area of the pin [μm] After aging |
|---|---|---|
| Example 5 | 380 | 400 |
| Example 6 | 330 | 345 |
| Comparative Experiment D | 2,000 | 2,000 |
| Comparative Experiment E | 850 | 1,230 |

We claim:

1. A magnetic recording medium which comprises a rigid-disk base and a magnetizable layer applied to at least one side thereof and containing magnetic particles finely dispersed in a polymeric binder and additives, and which possesses a lubricating coating on the surface of the magnetic layer, wherein the lubricating coating consists of a layer, of from 1 to 20 mg/m$^2$, of one or more perfluoropolyether oil mixtures selected from the group consisting of (a) a perfluoropolyether oil mixture of the general formula $$A\text{—}O\text{—}(C_3F_6O)_m\text{—}(CF_2O)_n\text{—}(CF\text{—}O)_q\text{—}B \quad (1)$$
$$|$$
$$CF_3$$

where m is an integer from 15 to 100, n is an integer from 1 to 80, q is an integer from 1 to 9, the sum (m+n+q) is an integer from 17 to 100, the ratio of n to m+q is from 0.06 to 1:1, —C$_3$F$_6$O—, —CF$_2$O— and —CF$_2$—O—
                       |
                       CF$_3$ are oxyperfluoroalkylene units distributed at random along the chain, and A and B are identical or different groups selected from amongst —CF$_3$, —C$_2$F$_5$ and —C$_3$F$_7$, and (b) a perfluoropolyether oil mixture of the general formula $$A\text{—}O\text{—}(C_2F_4O)_p\text{—}(CF_2O)_r\text{—}B \quad (2)$$

where p is an integer from 30 to 300, r is an integer from 5 to 300, the sum (p+r) is an integer from 35 to 600, the ratio of r to p is from 0.15 to 1.5:1, —C$_2$F$_4$O— and —CF$_2$O— are oxyperfluoroalkylene units distributed at random along the chain and A and B are —CF$_3$ or —C$_2$F$_5$.

2. A magnetic recording medium as set forth in claim 1, wherein the lubricant is applied at a level of from 2 to 15 mg/m$^2$.

* * * * *